J. F. KING.
ROLLER BEARING.
APPLICATION FILED OCT. 1, 1912. RENEWED SEPT. 23, 1914.

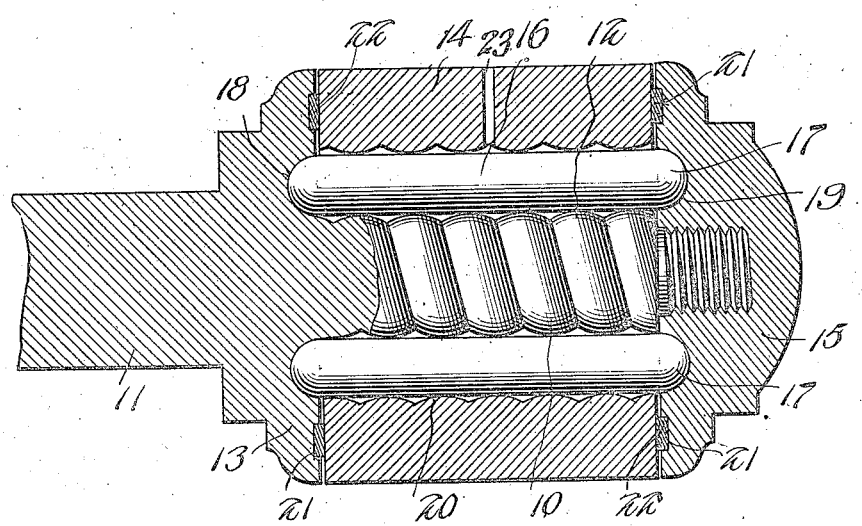
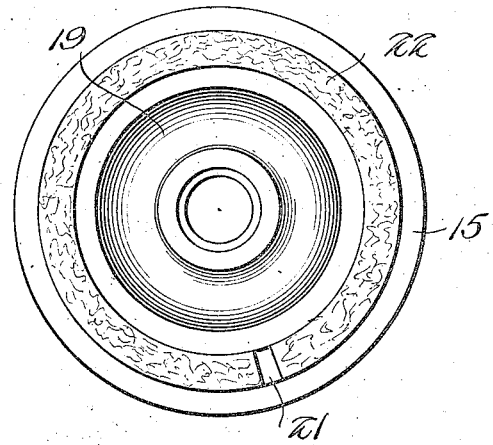
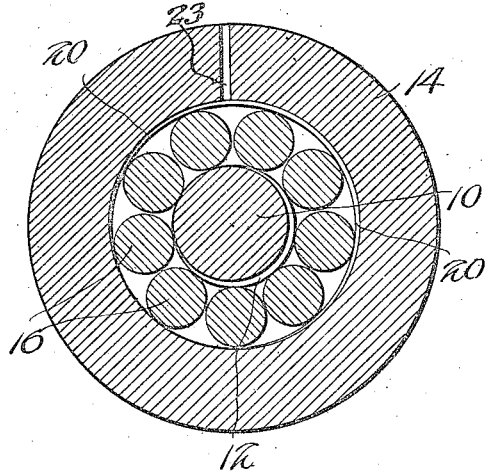

1,139,192.

Patented May 11, 1915.
2 SHEETS—SHEET 2.

Inventor
James Frank King
By Victor J. Evans
Attorney

Witnesses
Hugh Hott

UNITED STATES PATENT OFFICE.

JAMES FRANK KING, OF MILWAUKEE, WISCONSIN.

ROLLER-BEARING.

1,139,192. Specification of Letters Patent. Patented May 11, 1915.

Application filed October 1, 1912, Serial No. 723,396. Renewed September 23, 1914. Serial No. 863,222.

*To all whom it may concern:*

Be it known that I, JAMES FRANK KING, a citizen of the United States, residing at Milwaukee, in the county of Milwaukee and State of Wisconsin, have invented new and useful Improvements in Roller-Bearings, of which the following is a specification.

The invention relates to bearings, and more particularly to the class of roller bearings.

The primary object of the invention is the provision of a roller bearing wherein the rollers are arranged so as to entirely dispense with a boxing to hold the same in place and which will obviate constant use of lubricants.

Another object of the invention is the provision of a roller bearing wherein friction is reduced to a minimum and also obviating end thrusts.

A further object of the invention is the provision of a roller bearing wherein the same are confined so as to avoid the accumulation of dust, dirt or the like therein.

A still further object of the invention is the provision of a roller bearing in which the rollers are held in place about an axle and are devoid of pointed or sharp edges thereby assuring perfect action to minimize friction and also assure maximum speed.

A still further object of the invention is the provision of a roller bearing of this character which is simple in construction, durable, thoroughly reliable, and efficient in its purpose to afford a light running journal bearing and also which may be manufactured at a minimum cost.

With these and other objects in view the invention consists in the construction, combination and arrangement of parts as will be hereinafter more fully described, illustrated in the accompanying drawings, and pointed out in the claims hereunto appended.

Figure 4:
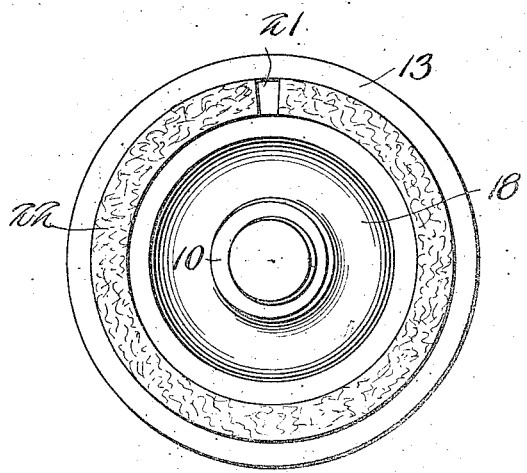
Figure 5:
Figure 6:
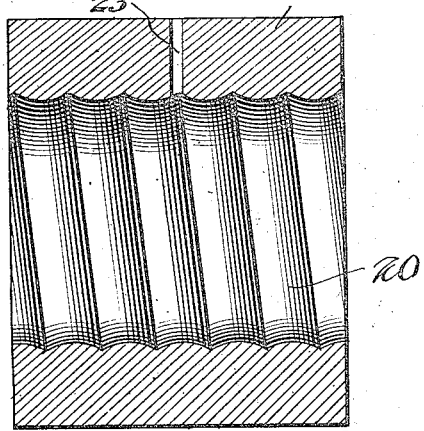

In the drawings: Figure 1 is a vertical longitudinal sectional view through a bearing constructed in accordance with the invention. Fig. 2 is a vertical transverse view thereof. Fig. 3 is an inner face view of the removable cap. Fig. 4 is an inner face view of the spindle flange. Fig. 5 is a side elevation of a roller bearing. Fig. 6 is a vertical longitudinal sectional view through the hub surrounding the spindle showing the detail construction thereof.

Similar reference characters indicate corresponding parts throughout the several views in the drawings.

Referring to the drawings by numerals the roller bearing comprises an inner bearing member 10 which will be hereinafter referred to as an axle or spindle and in this instance is shown integral with an extension 11, which may form a part of a vehicle axle or other similar structural portions. The axle or spindle 10 is formed with a spiral rib 12 which extends from the inner end thereof to a point near the outer end of the same, the said rib being rounded throughout its trend.

Formed at the inner end of the said spindle or axle 10 is an annular flange 13 against which the inner end of an axle box or hub 14 turns, the outer end of the spindle 10 being threaded to receive a cap 15 against which the outer end of the axle box or hub 14 turns. The spiral rib 12 affords at suitably selected intervals throughout the length of the spindle 10 independent or separate surfaces of contact.

Disposed about the spindle 10 are a series of rollers 16 each being of a uniform diameter throughout its length, and provided with semi-spherical shaped ends 17 which engage in correspondingly shaped race-ways 18 and 19 formed in the flange and cap 13 and 15 respectively, the rollers being designed to contact with the separate bearing surfaces of the spiral rib 12 of the said spindle 10, while formed on the inner periphery of the axle box or hub 14 is a spiral rib 20, the same being reversed with respect to the spiral rib 12 and is of rounded formation throughout its trend, the rollers contacting with the said rib 20 which forms at suitably selected intervals separate surfaces of contact for the rollers 16, and in this manner friction between the latter, axle and axle box is reduced to a minimum. The rollers 16 by reason of their rounded ends 17 engaged in the race-ways 18 and 19 respectively, are held in proper relation to each other for positive contact and obviate the possibility of end thrusts.

Formed concentrically about the raceways 18 and 19 in the flange 13 and cap 15 respectively are packing grooves 21 in which are seated packing rings 22, the latter working against the ends of the axle box or hub 14, thereby rendering the same dirt and dust proof. The axle box or hub 14 is provided with one or more air holes 23 which is designed to admit air to the roller 16 within the axle box or hub and thereby maintain the same cool.

It is evident that the rollers 16 will be sustained in proper relation to each other and will contact with the ribs 12 and 20, the rollers contacting with the said ribs at different points throughout the lengths of the rollers so as to obviate the use of a spacer frame or boxing for the roller and also minimize friction. The rollers 16 held within the axle box and traveling upon the ribs 12 and 20 will be prevented from exerting end thrusts and thereby entirely obviating the same.

The reversed trend of the ribs 12 and 20 causes a continued forward movement of the rollers 16 without conflicting end thrust action and furthermore the continuation of the said ribs assures a continued bearing contact for the rollers when the axle box or hub is rotated, sharp edges, angles and surfaces being avoided.

It will be apparent that by reason of the arrangement of the rollers the same will have an automatic action including a rotary and a revolutionary movement. The rollers will rotate freely on an imaginary axis and each and all of the rollers will freely and automatically revolve around the stationary bearing member. This is accomplished by dispensing entirely with the useless boxing for spacing and confining the rollers in the ordinary well-known manner. Furthermore, by reason of the spiral formation of the ribs 12 and 20 and the continuity thereof, the rollers by reason of contact therewith will uniformly wear throughout the length thereof, thereby avoiding ridges being formed on the rollers during constant use of the bearing.

From the foregoing description taken in connection with the accompanying drawings it is thought that the construction and operation of the invention will be clearly understood and therefore a more extended explanation has been omitted.

What is claimed is:

1. The combination with a stationary bearing member, of a rotary member mounted thereon, spirally arranged contacting surfaces formed on faces adjacent to each other of the said members and having their trends reversely disposed with respect to each other, and bearing rollers concentrically arranged about the stationary member and held within the rotary member for contact with the spiral surfaces.

2. The combination with a stationary bearing member, of a rotary member mounted thereon, spirally arranged contacting surfaces formed on faces adjacent to each other of the said members and having their trends reversely disposed with respect to each other, and bearing rollers concentrically arranged about the stationary member and held within the rotary member for contact with the spiral surfaces, the said spiral surfaces each having its convolutions of convex form throughout the extent thereof.

3. The combination with a stationary bearing member, and a rotatable member surrounding the same, of spiral ribs formed on the faces adjacent to each other of the said members, the said spiral ribs being extended in reverse directions to each other, and a series of rolling elements arranged concentrically with respect to the stationary member between it and the said rotary member and adapted for contact with the said spiral ribs.

4. The combination with a stationary bearing member, and a rotatable member surrounding the same, of spiral ribs formed on the faces adjacent to each other of the said members, the said spiral ribs being extended in reverse directions to each other, a series of rolling elements, arranged concentrically with respect to the stationary member between it and the said rotary member and adapted for contact with the said spiral ribs, and means carried by the stationary member and working against the rotary member to hold the said bearings against displacement longitudinally with respect to the members.

In testimony whereof I affix my signature in presence of two witnesses.

J. FRANK KING.

Witnesses:
 FRED A. TEALL,
 MYRTLE B. EDWARDS.